Figure 1:
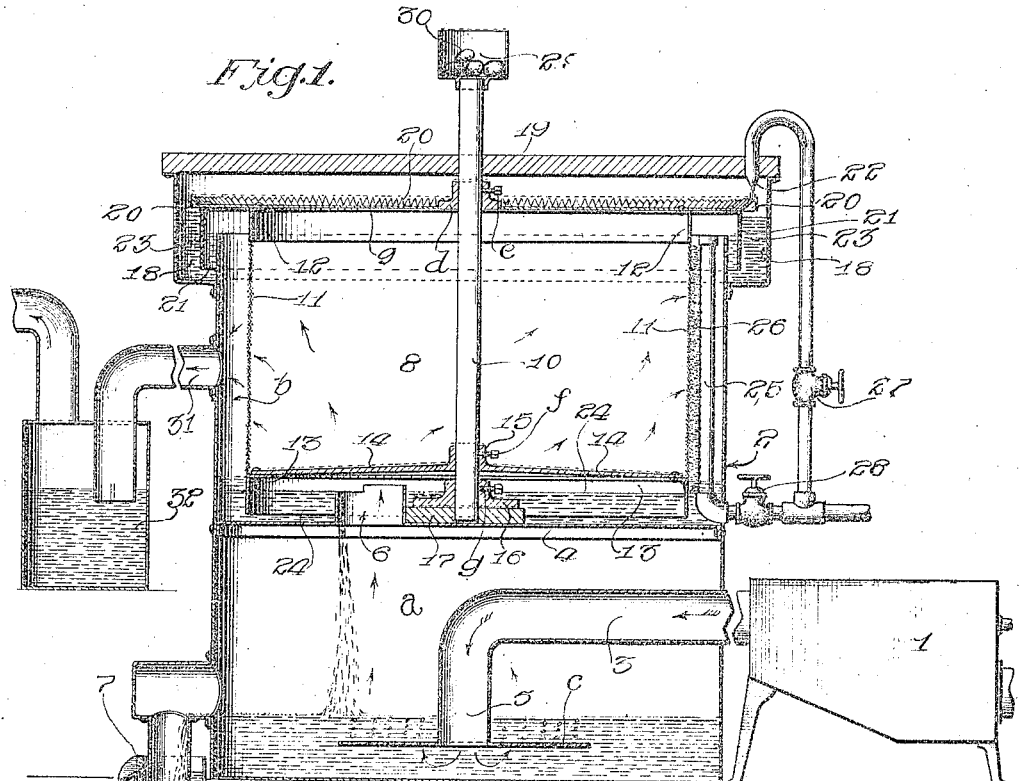

O. H. ENSIGN.
GAS WASHING APPARATUS.
APPLICATION FILED FEB. 4, 1908.

933,966.

Patented Sept. 14, 1909.

Witnesses:

Inventor,
Orville H. Ensign.
James R. Townsend
his atty.

UNITED STATES PATENT OFFICE.

ORVILLE H. ENSIGN, OF MADISON, WISCONSIN.

GAS-WASHING APPARATUS.

933,966.  Specification of Letters Patent.   Patented Sept. 14, 1909.

Application filed February 4, 1908. Serial No. 414,280.

*To all whom it may concern:*

Be it known that I, ORVILLE H. ENSIGN, a citizen of the United States, residing at Madison, in the county of Dane and State of Wisconsin, have invented a new and useful Gas-Washing Apparatus, of which the following is a specification.

The object of this invention is to provide improved means for removing the by-products from gas made from petroleum. The invention is applicable for washing other gas, and is also applicable for removing the soot from smoke.

The principle of this invention is that I provide in a small compass a large surface on which the products may accumulate, and provide automatic means for removing the products after a considerable accumulation has occurred; such removal being gradual and automatic so as to provide for a uniform cleaning of the gas, regardless of the quantity which is passing through the apparatus, up to the compass of the particular cleaner involved.

The invention comprises a gas-holder having a foraminous portion through which the gas may pass when freed from the impurities, as lamp-black, which this cleaner is to remove from the gas: said gas-holder being adapted to rise and fall as the gas pressure increases or decreases within the holder, and having an open bottom seated in a liquid seal, so that when the exit of gas through said foraminous portion is cut off, the gas pressure may lift and non-frictionally support it. The gas-holder forms within a shell or chamber a screen-like partition upon which the accumulation may occur; said partition being single or manifold, as may be deemed advisable, and adapted to rotate under the impulse of jets or sprays of water driven against the same for the purpose of washing off the accumulation of by-products; said partition being carried by the head of the holder and antifrictionally supported by the pressure of the gas similar to the rotatable element of the ordinary gas-holder, and may be guided by a vertical shaft in suitable guide bearings. If one screening of the gas proves insufficient, more than one of the permeable holders may be provided, and the partially-purified gas from one may be passed on to one or more other holders in series, if desired.

An object of this invention is to cause the deposits to form on a practically vertical surface, from which they may be washed with a minimum amount of water and with a maximum force of jet; provision being at the same time made whereby the filtering barrier will be kept of a practically uniform density or filtering capacity throughout its entire area. The screen may be rotated by the force of a single jet or by tangentially-directed cleaning jets, and its movement before such jet or jets will be regulated by making provision whereby, when the gas flows too freely through the screen, friction occurs to slow down or stop the rotation of the screen, so that more time is allowed for accumulations to occur before they are washed off by the cleansing jets. The portion of the passage for the gas which is at any time under the direct action of the cleansing jets is normally insufficient to allow the minimum product of the gas generator to pass therethrough, so that at all times while gas is being supplied to the interior of said holder, even when the apparatus is standing still, a quantity of gas must pass through portions of the screen other than that which is being directly cleansed.

It is desirable to use for the walls of the holder some form of a screen which is so fine that it will let the gas through, but not ever so small a particle of soot; but if this cannot be found, then the screen may be constructed in such a way that after the first accumulation there is a mat of carbon formed, through which the cleaning jets puncture small holes to let the gas through, and on this mat, carbon will more readily deposit than it will on any other substance. And it may further be found necessary that the only way to produce such mat will be to place two rather coarse wire-screens a short distance apart on the outer partition, and fill them with granular coke, having a dimension not greater than one-fourth of an inch for each grain; then in any case this will become covered with the soot from the gas until it has practically closed off all means of gas passing in through the screen, or nearly so. When it has closed it off to such an extent that it offers sufficient resistance to produce a back pressure, it will lift the screen as a holder, and the screen will begin to revolve under the force of the jets; then if the jet did not clean the screen, the holder will gradually speed up and will run as a totally-tight, inverted tank perfectly free; but as it begins to revolve, the jets will clean out a few places here and there,—presumably a large number of very small openings which will keep the pressure from rising any higher, and the screen will assume a rate of rotation necessary to meet a certain pressure which may be predetermined by the force of the jet, the total weight of the screen, and the adjustment of a counterbalance weight, if any is found necessary. These elements once predetermined, give a certain value to the cleanliness of the gas. It can be readily seen that the easier the screen will lift, the more readily it will turn, and hence probably freer and more general over the whole surface of the screen will be the openings through which the gas will pass.

An object of this invention is to provide means whereby the foraminous holder is adapted to rotate under the action of the spray with minimum frictional resistance, and to avoid any contact of the foraminous wall with any impurities that may be in the water-seal or may float thereon, as scum; and also to allow comparatively-dry coatings of soot to occur on the vertical walls throughout a considerable portion of the holder, so that the tendency of said accumulations is to break off and fall readily from the weight of the accumulations when the water is applied to the outside of the wall from a direction reverse to that in which the gas passes. That is to say, with this device no portion of the foraminous wall need be submerged, and the only water that is applied to said wall is that of the spray which strikes the outside of the wall, thereby tending to loosen the hold of the soot accumulating on the inside.

In this invention provision is made for maintaining a level of the water-seal close to the bottom of the holder, and the lower part of said holder which is submerged in the water-seal may be imperforate so that a comparatively small portion of the holder is in contact with the water-seal, and nearly all of the vertical walls of the holder are utilized for cleansing purposes.

The accompanying drawings illustrate the invention in the form I at present deem simplest and most desirable.

Figure 2:
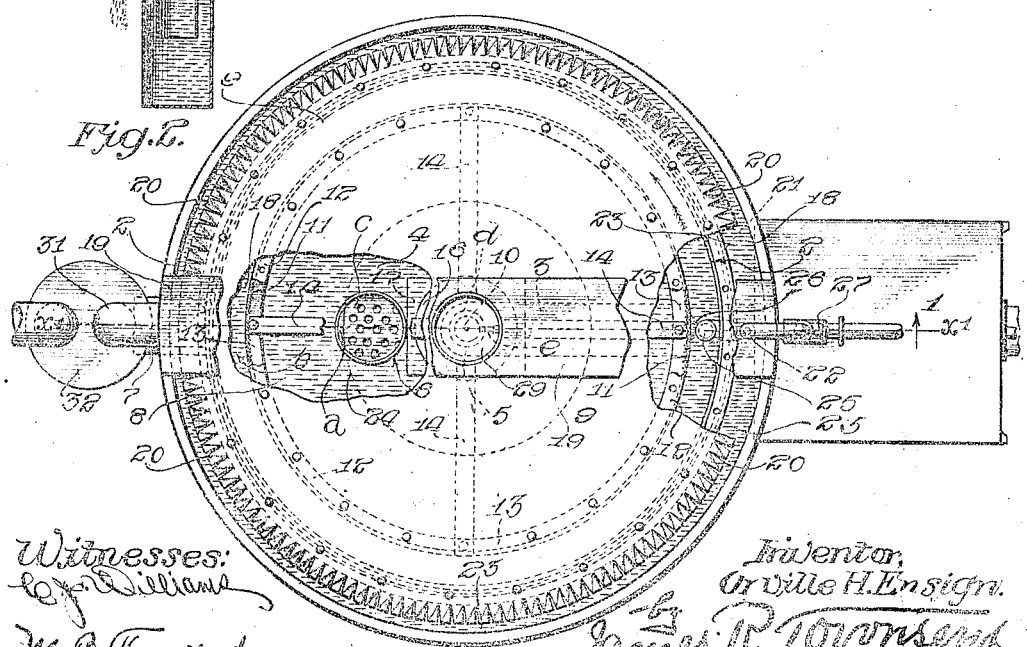

Figure 1 is a broken vertical axial section on line $x^1$, Fig. 2, the generator being shown unsectioned. Fig. 2 is a broken plan, partly in section.

1 designates a gas generator, and 2 an open-topped container forming the outside shell of the gas-washer which is connected with the generator 1 by an inlet pipe 3 and is fitted with a false bottom 4 to form lower and upper compartments $a$, $b$, in the first of which is provided a cooling seal 5 of suitable liquid, as water, below the surface of which the inlet pipe 3 opens, the same being provided around its outlet below the surface of the seal with a horizontal foraminous flange $c$ to spread the inflowing, hot, impure gas and cause it to be disseminated through the cooling liquid.

6 is a tubular passage communicating between the lower and upper compartments $a$ and $b$, and 7 is an overflow seal for the lower compartment $a$.

8 designates a gas-holder and purifier comprising an impervious top plate 9 adjustably mounted by a collar $d$ and a set-screw $e$ on a centrally-arranged shaft 10, and having a foraminous vertical wall 11 which is preferably a very fine screen connected to the top plate 9 by a circular angle-iron 12. The lower end of the screen-wall 11 is steadied and held in position by a circular angle-ring 13 which is attached by spokes 14 to a hub 15 that is adjustably mounted on the shaft 10 by a set-screw $f$.

16 is a flange adjustably mounted by a set-screw $g$ on the shaft 10 to form a base therefor to rest on a block 17 carried by the false bottom or floor 4.

The open top of the shell 2 is provided with a water-seal-trough 18 on the rim of which is supported a timber 19 that holds the shaft 10 upright. The opening in said timber through which the shaft extends upward, is sufficiently free from the shaft to allow said shaft to rotate freely therein when occasion for such rotation occurs.

The edge of the plate 9 is formed in vanes 20. These vanes terminate outside a cylindrical collar 21 and are acted upon by a jet of suitable liquid, as water from a jet-piece 22, which discharges downward onto the vanes from which the liquid falls into the trough 18 to form liquid seal 23, for the collar 21, to prevent escape of gas from the top compartment $b$. The collar 21 is of sufficient diameter and depth to surround the top of the shell 2 and extend down into the seal 23, the overflow of which passes over the top of the shell 2 and down into the bottom of said shell, where it assists in forming a liquid seal 24 into which angle-ring 13 extends to prevent escape of gas from the gas-holder 8, except through the foraminous vertical wall thereof.

25 is an upright pipe provided with jet-holes 26 for discharging upon the vertical foraminous wall 11 in a vertical line a cleansing spray adapted to loosen and wash from the wall 11 the soot which may adhere to the wall at that place. The vertical pipe 25 is within the shell 2 and outside the holder 8, and the wash-water therefrom flows down into the bottom of the upper compartment $b$ to assist in forming the seal 24, the overflow from which flows down through the cylindrical passage 6 into the lower compartment $a$ where it forms the cooling seal 5 from whence the overflow passes through the overflow seal 7.

The upper end of the tubular passage 6 is lower on the side thereof nearest the overflow seal 7, thus to concentrate the overflow from the seal 24 so as to readily carry away the soot which is washed from the foraminous wall 11 by the spray from the holes 26.

27 and 28 designate valves to control the outflow from the jet-piece 22 and the spray-pipe 25.

29 designates a box in which weights may be applied to give greater resistance to the lifting power of the gas in the holder 8, so that a requisite pressure of the gas in the holder 8 may be maintained to cause the flow of the gas through the foraminous filtering wall 11 to be practically uniform all around the wall. The shaft 10, spokes 14, and the parts connected therewith, are preferably of metal, and their weight is approximately sufficient for this purpose, and the weight-box 29 is supplied to allow the operator to add to or take away therefrom more or less of the adjusting weight 30 in the box 29.

The spray-pipe 25 is preferably arranged on the side of the container 2 opposite the outlet 31 from the upper compartment $b$, so that the escape of gas from the vertically-movable holder 8 will have to pass around said holder, thus to equalize the pressure around the wall 11 so that there will not be an excessive flow of gas through the cleansed portion of said wall.

32 designates a seal for the outlet 31.

In practical operation the gas from generator 1 flows through the pipe 3 and cooling seal 5, where it is cooled, and thence it rises through the passage 6 into the holder 8 which it fills and then passes outward through the fine screen 11. The soot carried by the gas is obstructed by and clogs the screen, and thereupon the pressure of the gas within the holder increases, thus balancing the weight of the holder, and thereby lessening the friction between the flanged foot 16 and the block 17 until the holder 8, actuated by the jet from the jet-piece 22, begins to turn, whereupon the spray from the spray-pipe 25 cleanses to some extent the portion of the wall 11 which passes in front of such spray, thereby allowing the gas to escape more freely from the holder. This tends to lower the pressure and the lifting power of the gas in the holder, whereupon the holder settles downward, thus applying and increasing the friction between the foot 16 and the block 17, thereby regulating the speed of rotation of the holder, and consequently the speed of cleaning the screen. The degree of cleaning can be adjusted by regulating the force of the jet from the jet-piece 22 and by increasing or decreasing the weight 30 in the weight-box 29.

By this construction the major part of the foraminous holder-wall 11 may be kept dry and covered with a coating of dry soot upon which the accumulations of soot will rapidly form, thus producing a filter that is effective to thoroughly remove the soot. By regulating the spray and jet and the amount of the weight 30, the thickness of the deposit of soot on the inside of the walls 11 may be adjusted so as to secure the most effective operation and most rapid and thorough cleaning of the gas.

In Fig. 1 dotted lines just above the holder and the weight-box indicate a position to which the holder may be lifted by the pressure of the gas within the same, but it is to be understood that the antifrictional support of the holder by the gas to any degree may be sufficient to allow the force of the jet to rotate the holder, and that in some instances the force of the gas may be great enough to lift the holder bodily to the beam, whereupon the collar $d$ engaging the beam 19 will prevent the holder from becoming unsealed.

As the pressure of gas increases, the removal of accumulations from the foraminous portion automatically increases, and as such removal increases, the escape of gas is facilitated, and thereupon the pressure of gas in the holder decreases and a retardation of the holder is then effected until the amount of accumulation and removal becomes balanced; or until complete stoppage of rotation by reason of the frictional support of the holder, or until an increase of outflow of gas creates an increase of accumulations, whereupon the holder will again rise under increased pressure of gas therein, and so become again subject to speedy rotation and rapid cleansing, and so on.

I claim:—

1. A gas washer comprising a shell, an open-bottomed gas holder constructed to be moved up and down and provided with a foraminous wall, a liquid seal for the holder, means to supply gas to the holder, means to wash soot from the holder, and means to rotate the holder upon the same being supported by the gas therein.

2. A gas washer comprising a holder provided with foraminous walls, a frictional support therefor, means for washing accumulations therefrom at one place, and means for automatically rotating the holder when antifrictionally supported by the gas therein.

3. A gas washer comprising a container, a rotatable gas holder therein having a vertical foraminous wall, means for passing gas into said holder and through said wall, and jet means outside of the gas holder for loosening and washing accumulations from said wall as the gas holder is rotated.

4. A shell provided with a gas inlet and a gas outlet, a rotatable gas holder in the shell arranged to receive gas from said inlet and provided with a vertical foraminous wall to supply gas to said outlet, and means outside of the gas holder for removing accumulations from said wall as it is rotated.

5. A gas washer comprising a gas holder adapted to be moved up and down and provided with a cylindrical foraminous wall, means to supply gas to the inside of said holder, means to automatically rotate said holder, and means to apply a spray to wash accumulations from the wall of said holder.

6. A gas washer comprising a shell provided with a compartment and a tubular inlet into said compartment, an outlet from said compartment, a seal in said compartment, a gas holder in said compartment provided with a foraminous wall, and adapted to move up and down in said seal and extending thereabove, means to supply a spray to cleanse the wall at one portion thereof, and means for rotating the holder upon the same being raised by the pressure of the gas therein.

7. A gas washer comprising a container having superposed compartments, a tubular passage between said compartments to form a seal retainer in the upper compartment, a sealed overflow for the lower compartment, a sealed outlet for the upper compartment, a seal trough around the rim of the container, an inlet to supply gas to the lower compartment, a holder over said passage provided with a foraminous wall in the upper compartment and with an impervious top extending outside the container, a seal between said top and the rim of the container, a seal for the lower end of the holder, means for removing accumulations from the holder, and means for automatically rotating the holder to cause such removal to occur at different portions of said wall.

8. A gas washer comprising a container having two compartments, a passage between said compartments, a seal in the upper compartment, a seal overflow for the lower compartment, a seal outlet for the upper compartment, an inlet to supply gas to the lower compartment, a holder provided with a foraminous wall in the upper compartment and with an impervious top, a seal between the impervious top and the rim of the container, means for moving accumulations from the holder, and means for automatically rotating the holder to cause such removal to occur at different portions of said wall.

9. A gas washer comprising a holder having a foraminous wall and an impervious top, an open-top container for said holder, a seal between the top of the holder and the rim of the container, a seal in the container for the bottom of the holder, means to supply gas to the inside of the holder, a gas outlet from the container, and means to remove accumulations from the holder.

10. A gas washer comprising a holder having a foraminous wall and an impervious top, an open-top container for said holder, a seal between the top of the holder and the rim of the container, a seal in the container for the bottom of the holder, means to supply gas to the inside of the holder, a gas outlet from the container, means to remove accumulations from the holder, and means to rotate the holder to cause such removal to occur at different places thereon.

11. A gas washer comprising a holder having a foraminous wall and an impervious top, an open-top container for said holder, a seal between the top of the holder and the rim of the container, a seal in the container for the bottom of the holder, means to supply gas to the inside of the holder, a gas outlet from the container, means to remove accumulations from the holder, a frictional support for the holder, and means to rotate the holder to increase such removal when the friction of said support is lessened.

12. A gas washer comprising a holder having a foraminous wall and an impervious top, an open-top container for said holder, a seal between the top of the holder and the rim of the container, a seal in the container for the bottom of the holder, means to supply gas to the inside of the holder, a gas outlet from the container, means to remove accumulations from the holder, a frictional support for the holder, vanes on said holder, and a jet-piece to discharge liquid onto said vanes to rotate the holder when the friction of said support is lessened.

13. A gas washer comprising a holder having a foraminous wall and an impervious top, an open top container for said holder, a seal between the top of the holder and the rim of the container, a seal in the container for the bottom of the holder, means to supply gas to the inside of the holder, a gas outlet from the container, and means to project a spray to remove accumulations from a portion of said holder, and means to rotate the holder to cause such removal to occur at different places thereon.

14. A gas washer comprising a holder having a foraminous wall and an impervious top, an open-top container for said holder, a seal between the top of the holder and the rim of the container, a seal in the container for the bottom of the holder, means to supply gas to the inside of the holder, a gas outlet from the container, means to project a spray to remove accumulations from a portion of said holder, a frictional support for the holder, and means to rotate the holder when the friction of said support is lessened.

15. A gas washer comprising a holder having a foraminous wall and an impervious top, an open-top container for said holder, a seal between the top of the holder and the rim of the container, a seal in the container for the bottom of the holder, means to supply gas to the inside of the holder, a gas outlet from the container, a frictional support for the holder, means to project a spray to remove accumulations from a portion of said holder, and means to rotate the holder when the friction of said support is lessened.

16. A gas washer comprising a holder having a foraminous wall and an impervious top, an open-top container for said holder, a seal between the top of the holder and the rim of the container, a seal in the container for the bottom of the holder, means to supply gas to the inside of the holder, a gas outlet from the container, a frictional support for the holder, means to project a spray to remove accumulations from a portion of said holder, vanes on said holder, and a jet-piece to discharge a jet onto said vanes to rotate the holder when the friction of said support is lessened.

17. A gas washer comprising a vertically-movable holder having a foraminous wall and an impervious top, an open-top container for said holder, a seal between the top of the holder and the rim of the container, a seal in the container for the bottom of the holder, means to supply gas to the inside of the holder, a gas outlet from the container, and means to remove accumulations from the holder.

18. A gas washer comprising a vertically-movable holder having a foraminous wall and an impervious top, an open-top container for said holder, a seal between the top of the holder and the rim of the container, a seal in the container for the bottom of the holder, means to supply gas to the inside of the holder, a gas outlet from the container, means to remove accumulations from the holder, and means to rotate the holder to cause such removal to occur at different places thereon.

19. A gas washer comprising a vertically-movable holder having a foraminous wall and an impervious top, an open-top container for said holder, a seal between the top of the holder and the rim of the container, a seal in the container for the bottom of the holder, means to supply gas to the inside of the holder, a gas outlet from the container, means to remove accumulations from the holder, a frictional support for the holder, and means to rotate the holder to increase such removal upon lessening of the friction of said support.

20. A gas washer comprising a vertically-movable holder having a foraminous wall and an impervious top, an open-top container for said holder, a seal between the top of the holder and the rim of the container, a seal in the container for the bottom of the holder, means to supply gas to the inside of the holder, a gas outlet from the container, means to remove accumulations from the holder, a frictional support for the holder, vanes on said holder and a jet-piece to discharge liquid onto said vanes to rotate the holder upon lessening of the friction of said support.

21. A gas washer comprising a vertically-movable holder having a foraminous wall and an impervious top, an open-top container for said holder, a seal between the top of the holder and the rim of the container, a seal in the container for the bottom of the holder, means to supply gas to the inside of the holder, a gas outlet from the container, means to project a spray to remove accumulations from a portion of said holder, and means to rotate the holder to cause such removal to occur at different places thereon.

22. A gas washer comprising a vertically-movable holder having a foraminous wall and an impervious top, an open-top container for said holder, a seal between the top of the holder and the rim of the container, a seal in the container for the bottom of the holder, means to supply gas to the inside of the holder, a gas outlet from the container, means to project a spray to remove accumulations from a portion of said holder, a frictional support for the holder, and means to rotate the holder upon lessening of the friction of said support.

23. A gas washer comprising a vertically-movable holder having a foraminous wall and an impervious top, an open-top container for said holder, a seal between the top of the holder and the rim of the container, a seal in the container for the bottom of the holder, means to supply gas to the inside of the holder, a gas outlet from the container, a frictional support for the holder, means to project a spray to remove accumulations from a portion of said holder, and means to rotate the holder upon lessening of the friction of said support.

24. A gas washer comprising a vertically-movable holder having a foraminous wall and an impervious top, adjustable means to depress the holder, an open-top container for said holder, a seal between the top of the holder and the rim of the container, a seal in the container for the bottom of the holder, means to supply gas to the inside of the holder, a gas outlet from the container, and means to remove accumulations from the holder.

25. A gas washer comprising a vertically-movable holder having a foraminous wall and an impervious top, adjustable means to depress the holder, an open-top container for said holder, a seal between the top of the holder and the rim of the container, a seal in the container for the bottom of the holder, means to supply gas to the inside of the holder, a gas outlet from the container, means to remove accumulations from the holder, and means to rotate the holder to cause such removal to occur at different places thereon.

26. A gas washer comprising a vertically-movable holder having a foraminous wall and an impervious top, adjustable means to depress the holder, an open-top container for said holder, a seal between the top of the holder and the rim of the container, a seal in the container for the bottom of the holder, means to supply gas to the inside of the holder, a gas outlet from the container, means to remove accumulations from the holder, a frictional support for the holder, and means to rotate the holder to increase such removal when the friction of said support is lessened.

27. A gas washer comprising a vertically-movable holder having a foraminous wall and an impervious top, adjustable means to depress the holder, an open-top container for said holder, a seal between the top of the holder and the rim of the container, a seal in the container for the bottom of the holder, means to supply gas to the inside of the holder, a gas outlet from the container, means to remove accumulations from the holder, a frictional support for the holder, vanes on said holder, and a jet-piece to discharge liquid onto said vanes to rotate the holder when the friction of said support is lessened.

28. A gas washer comprising a vertically-movable holder having a foraminous wall and an impervious top, adjustable means to depress the holder, an open-top container for said holder, a seal between the top of the holder and the rim of the container, a seal in the container for the bottom of the holder, means to supply gas to the inside of the holder, a gas outlet from the container, means to project a spray to remove accumulations from a portion of said holder, and means to rotate the holder to cause such removal to occur at different places thereon.

29. A gas washer comprising a vertically-movable holder having a foraminous wall and an impervious top, adjustable means to depress the holder, an open-top container for said holder, a seal between the top of the holder and the rim of the container, a seal in the container for the bottom of the holder, means to supply gas to the inside of the holder, a gas outlet from the container, means to project a spray to remove accumulations from a portion of said holder, a frictional support for the holder, and means to rotate the holder when the friction of said support is lessened.

30. A gas washer comprising a vertically-movable holder having a foraminous wall and an impervious top, adjustable means to depress the holder, an open-top container for said holder, a seal between the top of the holder and the rim of the container, a seal in the container for the bottom of the holder, means to supply gas to the inside of the holder, a gas outlet from the container, a frictional support for the holder, means to project a spray to remove accumulations from a portion of said holder, and means to rotate the holder upon lessening of the friction of said support.

31. A gas washer comprising a vertically-movable holder having foraminous walls and a frictional support, means to supply gas to the holder, means to remove accumulations from a foraminous portion of said holder, and means to rotate the holder upon lessening of the friction of said support.

32. A gas washer comprising a vertically-movable holder having foraminous walls and a frictional support, means to supply gas to the holder, means to remove accumulations from a foraminous portion of said holder, variable means to depress the holder, and means to rotate the holder upon lessening of the friction of said support.

33. A gas washer comprising a vertically-movable holder having a frictional support and a foraminous portion for passage of gas, means to supply gas to the holder, means to remove accumulations from part of the foraminous portion, and means to rotate the holder to increase the area subject to such removal upon lessening of or avoidance of the friction of said support.

34. A gas washer comprising a holder having a vertical foraminous portion, spraying means to remove accumulations from a part of such foraminous portion, and means to rotate the holder.

35. A gas washer comprising a holder having a foraminous portion, spraying means to remove accumulations from a part of such portion, means to cause rotation of the holder when the same is gas-supported, and means to retard such rotation upon lessening of such support.

36. A gas washer comprising a holder having a foraminous portion to gather accumulations from gas escaping therefrom, means for removing such accumulations, and means for automatically increasing and decreasing such removal as the pressure of gas in the holder increases and decreases.

37. A gas washer comprising a holder having a foraminous portion, means to rotate the holder, means to remove accumulations from the foraminous holder as the same rotates, and means for retarding or stopping such rotation on a reduction of the pressure within the holder.

In testimony whereof, I have hereunto set my hand at Madison, Wisconsin, this 13th day of January, 1908.

ORVILLE H. ENSIGN.

In presence of—
  M. A. KILCOURSE,
  A. H. AYERS.